United States Patent
Ahmed et al.

(10) Patent No.: US 9,042,866 B2
(45) Date of Patent: May 26, 2015

(54) METHOD FOR ACCESSING A CSG FEMTOCELL

(75) Inventors: Tansir Ahmed, Ilford (GB); Delphin Barankanira, Antony (FR)

(73) Assignee: FRANCE TELECOM, Paris (FR)

( * ) Notice: Subject to any disclaimer, the term of this patent is extended or adjusted under 35 U.S.C. 154(b) by 53 days.

(21) Appl. No.: 13/701,738

(22) PCT Filed: May 31, 2011

(86) PCT No.: PCT/EP2011/058918
§ 371 (c)(1),
(2), (4) Date: Feb. 12, 2013

(87) PCT Pub. No.: WO2011/151312
PCT Pub. Date: Dec. 8, 2011

(65) Prior Publication Data
US 2013/0210385 A1    Aug. 15, 2013

(30) Foreign Application Priority Data
Jun. 2, 2010   (EP) .................................... 10305580

(51) Int. Cl.
*H04W 12/06*   (2009.01)
*H04W 48/16*   (2009.01)
*H04W 12/08*   (2009.01)
*H04W 48/10*   (2009.01)

(52) U.S. Cl.
CPC .............. *H04W 48/16* (2013.01); *H04W 12/06* (2013.01); *H04W 12/08* (2013.01); *H04W 48/10* (2013.01)

(58) Field of Classification Search
CPC ... H04W 48/045; H04W 48/16; H04W 48/18; H04W 48/02; H04W 48/08; H04W 12/06; H04W 12/08

USPC ........ 455/411, 456.1, 444, 435.1, 414.1, 418, 455/419, 517
See application file for complete search history.

(56) References Cited

U.S. PATENT DOCUMENTS

2009/0047968 A1* 2/2009 Gunnarsson et al. .......... 455/446
2009/0270096 A1 10/2009 Somasundaram et al.
(Continued)

FOREIGN PATENT DOCUMENTS

WO    2010/110706 A1    9/2010

OTHER PUBLICATIONS

XP (3GPP TSG SA WG2 Meeting #72, Mar. 30-Apr. 3, 2009, Motorola, H(e)NB discovery with ANDSF).*
(Continued)

*Primary Examiner* — Khai M Nguyen
(74) *Attorney, Agent, or Firm* — David D. Brush; Westman, Champlin & Koehler, P.A.

(57) ABSTRACT

A method implemented by a terminal for accessing a CSG femtocell of a first access network. The terminal includes a list containing identifiers of CSG femtocells to which an access right is defined. The method includes: scanning a frequency band for discovering CSG femtocells; decoding, based on a key, a data stream broadcasted from the CGS femtocells; obtaining, based on the decoded data stream, an identifier of the CSG femtocells; and determining, based on the list, whether the terminal has authorized access to the discovered femtocells. The frequency band, the key or the list is determined based on a message received from a remote server via a second cellular access network different from the first access network.

13 Claims, 2 Drawing Sheets

(56) References Cited

U.S. PATENT DOCUMENTS

| | | | |
|---|---|---|---|
| 2011/0111745 A1* | 5/2011 | Li et al. | 455/422.1 |
| 2012/0015681 A1* | 1/2012 | Dalsgaard et al. | 455/517 |
| 2012/0122422 A1* | 5/2012 | Olsson et al. | 455/410 |
| 2012/0264475 A1* | 10/2012 | Aoyagi | 455/517 |

OTHER PUBLICATIONS

3GPP TSG-RAN WG2 Meeting #70, Montreal, Canaada, May 10th-14th, 2010.*

International Search Report and Written Opinion dated Sep. 5, 2011 for corresponding International Application No. PCT/EP2011/058918, filed on May 31, 2011.

Telecom Italia et al.: "Pseudo-CR on Allowed CSG List Update", 3GPP Draft; C1-083427, 3rd Generation Partnership Project, Mobile Competence Centre; 650, Route Des Lucioles; F-06921 Sophia-Antipolis Cedex; France dated Aug. 22, 2008.

Huawei: "Some corrections to 25.367", 3GPP Draft; 25367__CR0018__(REL-9)__R2-103355, 3rd Generation Partnership Project (3GPP), Mobile Competence Centre ; 650, Route Des Lucioles ; F-06921 Sophia-Antipolis Cedex ; France, vol. RAN WG2, No. Montreal, Canada; May 10, 2010, May 15, 2010, XP050423402.

33GPP: "H(e)NB discovery with ANDSF (S2-092369)", Mar. 24, 2009, pp. 1-2, XP002605616, Hangzhou, China Retrieved from the Internet: URL: http://www.3gpp.com/ftp/TSG_SA/WG2__Arch/TSGS2__72__Hangzhou/Docs [retrieved on Oct. 15, 2010].

* cited by examiner

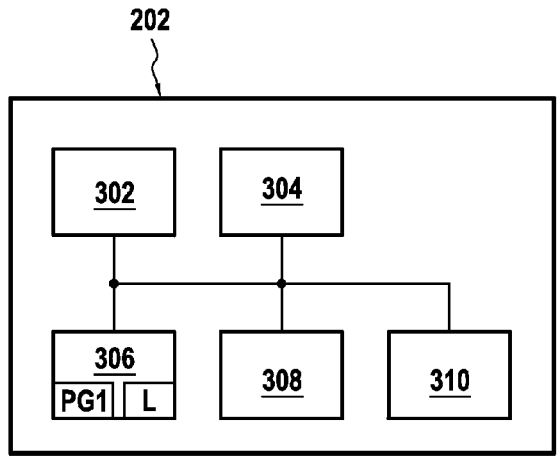
FIG.3
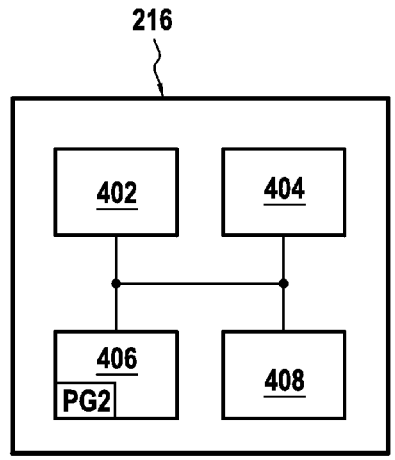
FIG.4
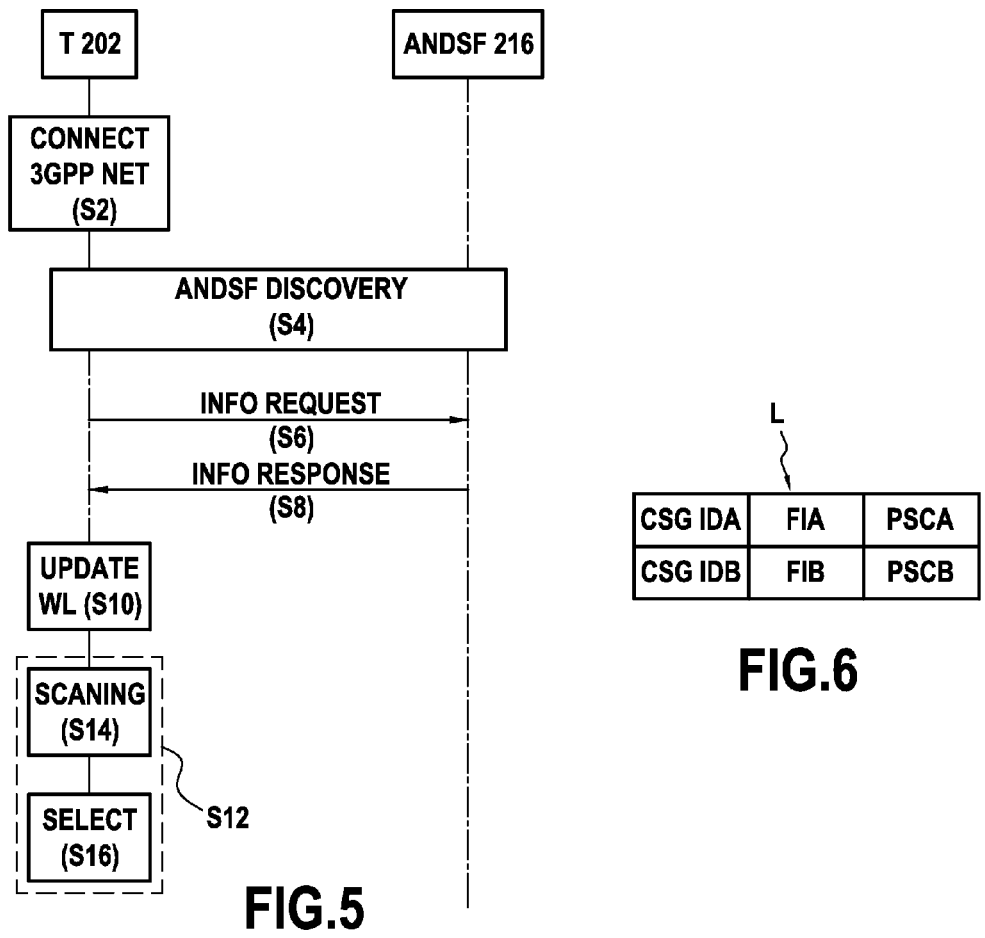
FIG.5
FIG.6

METHOD FOR ACCESSING A CSG FEMTOCELL

CROSS-REFERENCE TO RELATED APPLICATIONS

This Application is a Section 371 National Stage Application of International Application No. PCT/EP2011/058918, filed May 31, 2011, which is incorporated by reference in its entirety and published as WO 2011/151312 on Dec. 8, 2011, in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to the connectivity of a terminal to Closed Subscriber Group (CSG) femtocells.

BACKGROUND OF THE DISCLOSURE

Various ways exist today to access IP services over the Internet. Today's cellular networks for instance allow users to establish a connection while they are roaming in different geographical areas. Third generation (3G) networks (UMTS, CDMA2000 networks . . . ) for example are now deployed in most of industrialised countries, allowing simultaneously wide-area wireless voice telephone calls and wireless data transfer all in a mobile environment.

A cellular network is a radio network made up of a number of juxtaposed cells, each of which being served by at least one fixed-location transceiver known as cell site or base station. When joined together, the base stations provide radio coverage over a wide geographic area. This enables a large number of portable transceivers (user equipment such as mobile phones, computer, pagers, etc) to communicate with each other and with fixed transceivers anywhere in the network, via BSs, even if some of the transceivers are moving through more than one cell during transmission.

The cells constituting a cellular network may be of different ranges depending on the circumstances. Macrocells for instance correspond to cells providing the widest coverage area. Macrocells are usually served by high power cellular base station mounted on high structures (rooftops etc.). A cellular network may also include microcells, i.e. cells served by low power cellular base stations and providing smaller coverage areas. A cellular network comprising microcells is sometimes named microcell cellular network.

Cells known as femtocells have also experienced significant developments over the last years. A femtocell is an even smaller cellular cell served by a small cellular base station. Femtocell networks are typically designed for the realization of high density wireless deployments in urban areas (e.g. 3GPP cellular networks, WiMAX networks, etc.). The femtocell concept allows users to install their own small base station in indoor environment using licensed spectrum, typically for domestic use or for the purpose of small businesses. In other words, a femtocell enables service providers to extend service coverage indoors, especially where access would otherwise be limited or unavailable with conventional macrocell networks.

Based on access control, the $3^{rd}$ Generation Partnership Project (3GPP) has classified femtocell base stations into two categories: the Open Access femtocell base stations and the Closed Access femtocell base stations. An Open Access femtocell base station can serve any user equipment (UE) whereas a Closed Access femtocell base station only serves UEs which are members of a particular group called CSG. Such femtocells providing restricted access are known as CSG femtocells. The owner of a femtocell base station may for instance decide to restrict access to his own femtocell by creating a CSG, on the ground that he is the one assuming the expense of maintenance and the broadband connection to his premises.

FIG. 1 depicts an example of a terminal accessing IP services via a CSG femtocell network.

In this document, the term "terminal" will designate any UE such as a mobile phone, a PDA, a computer etc. operable to access a wireless access network.

In addition, it will be assumed in this example that the user of terminal 102 has subscribed to have authorised access to the CSG femtocell 106. The terminal may thus access IP services on the Internet 110 via CSG femtocell 106 which serves as a relay between terminal 102 and the core network 108. Once terminal 102 is attached to the base station 104 of CSG femtocell network 106, the core network 108 can route IP packets between the CSG femtocell network 106 and the Internet 110.

According to the existing 3GPP standard (TS 25.367 v9.2.0, "Mobility Procedures for Home NodeB; Stage 2; Overall Description (Release 9), December 2010"), each CSG femtocell is associated with:

- a specific carrier frequency identified by a corresponding frequency identifier (e.g. UTRA Absolute Radio Frequency Channel Number—UARFCN in UMTS system . . . ),
- a specific Primary Scrambling Code (PSC), and
- a unique numeric identifier called CSG Identity (CSG ID).

Carrier frequencies and PSCs of CSG femtocells are dependent upon the operator's deployment strategy, network planning, frequency allocation, etc. In most cases, a given network operator implements the same carrier frequencies and PSCs for each deployed CSG femtocell throughout a country.

The specific characteristics and use of each of the above parameters will be further described below.

To connect to a CSG femtocell network, terminal 102 must perform a discovering procedure followed by a selecting procedure (collectively named as discovering and selection procedure).

The discovering procedure implemented by terminal 102 consists of scanning all frequencies in the supported frequency bands to discover reachable CSG femtocell networks. It should be noted that, in this document, a "reachable" network (or cell) designates a network (or cell) that a terminal may physically reach because the two elements are located sufficiently closed to each other. However, access to a reachable network (or cell) may or may not be authorised depending in particular upon subscription rights of the terminal's user (i.e. user subscription data).

During this scanning step, terminal 102 executes a channel synchronisation mechanism so as to synchronise with CSG femtocell frequencies (i.e. frequencies used by reachable CSG femtocells) and to discover the respective PSC associated with each discovered reachable CGS femtocell.

Terminal then deciphers a data stream broadcasted by each of the discovered reachable CSG femtocell, using the obtained PSCs as decoding keys. When the discovered CSG femtocells are of the 3GPP type, the data streams in question correspond to cell- or system-specific data broadcasted by the discovered CSG femtocell networks.

As each CSG femtocell is associated with a specific PSC, terminal 102 is able to distinguish between reachable CSG femtocells by recognising their respective PSC.

This decoding (or deciphering) step allows terminal 102 to determine the unique CSG ID broadcasted by each of the discovered CSG femtocell.

Once the CSG ID of each discovered CSG femtocell is determined, terminal 102 determines which among the discovered CSG femtocells terminal 102 is authorised to access. To do so, terminal 102 has a list (usually named "whitelist") which may contain one or a plurality of authorised CSG IDs. Each authorised CSG ID corresponds to an authorised CSG femtocell, that is, a CSG femtocell that terminal 102 is authorised to access based on its user subscription data. It should however be noted that this whitelist may be empty. This is for instance the case when a new terminal is put into service without any preconfigured CSG cell information stored therein.

If the whitelist of terminal 102 does contain at least one authorised CSG ID, terminal 102 compares the CSG IDs broadcasted by the discovered CSG femtocells with the preconfigured authorised CSG IDs defined in the whitelist.

Terminal 102 then selects a discovered reachable CSG femtocell recognised as an authorised CSG femtocell during the discovering mechanism (selection procedure). The selecting procedure may be either manual or automatic. According to the manual selection mechanism, the user of terminal 102 manually selects the CSG ID of an authorised CSG femtocell he wishes to connect to. On the other hand, the automatic selection mechanism allows terminal 102 to automatically select an authorised CSG femtocell. In this respect, it is worth noting that if the whitelist of terminal 102 does not contain any CSG ID, terminal 102 must solely depends on the manual selection mechanism.

In the particular example of FIG. 1, terminal 102 discovers CSG femtocell 106 and determines that it has authorised access to this particular CSG femtocell based on the discovering procedure described above. Therefore, terminal 102 selects CSG femtocell 106 and attaches to the corresponding bases station 104 to access IP services on the Internet 110 via CSG femtocell 106.

However, the existing CSG femtocell discovering and selection procedure specified by 3GPP group presents major drawbacks. For instance, a terminal is compelled to perform a scanning search throughout the entire spectrum of the supported frequency bands to complete the discovering procedure. Such a scanning search demands significant amount of battery power, thereby resulting in unnecessary wastage of UE's battery power. Furthermore, this search is particularly time consuming and therefore may delay the CSG femtocell attachment process, especially in an area densely populated by a number of femtocell base stations.

Further, the execution of this complete scanning search does not guarantee the discovering of all accessible CSG femtocell networks. The distribution of authorised and unauthorised (i.e. forbidden) CSG femtocells for a particular terminal can vary on a regular basis depending on the operator's deployment strategy. Therefore, a terminal may discover a CSG femtocell network and unnecessarily attempt to connect thereto even though this particular network is no longer authorised for this terminal. Conversely, a terminal may ignore a discovered CSG femtocell network while this network has been recently made available for this terminal.

There are however some optional features proposed by 3GPP to optimize the discovering and selection procedure of CSG femtocells, where the femtocells can also broadcast carrier frequency indication, PSC range in use, etc. Since, whether a specific femtocell will broadcast this optional information or not depends on whether the equipment manufacturer has implemented this feature on the femtocell, there is no guarantee that the UE will be able to use the feature.

Accordingly, there is a need for an improved mechanism which alleviates the drawbacks of the existing CSG femtocell discovering and selection procedure.

SUMMARY

An embodiment of the present invention provides a method implemented by a terminal for accessing a CSG femtocell of a first access network, wherein the terminal comprises a list which may contain at least one identifier of a CSG femtocell to which an access right for said terminal is defined, the method comprising:

scanning at least one frequency band for discovering at least one CSG femtocell;

decoding, based on a key, a data stream broadcasted from the at least one CGS femtocell;

obtaining, based on the decoded data stream, at least one identifier of the CSG femtocell; and determining, based on the list, whether said terminal has authorised access to the at least one discovered femtocell;

the method being characterised in that at least one parameter chosen among the at least one frequency band, the key and the list is determined based on a message received from a remote server via a second cellular access network different from said first access network.

An embodiment of the invention enables a terminal to obtain useful and up-to-date access information regarding CSG femtocells prior to embarking into a discovering and selection procedure to connect to a reachable CGS femtocell. As a result, an embodiment of the invention allows the procedure for accessing CSG femtocells to be more efficient.

More specifically, an embodiment of the invention enables a terminal to dynamically determine, prior to initiating a discovering procedure, at least one access parameter chosen among:

a frequency to be scanned by said terminal for discovering at least one CSG femtocell;

a PSC to be used as a key for decoding a message broadcasted by a CSG femtocell; and a CSG identifier of a CSG femtocell.

Based on the access information received from the remote server, the terminal is able to speed up its discovering and selection procedure, thus saving battery power. It also allows the terminal to keep its list of CSG femtocells (allowed to access or not allowed to access) up-to-date so as to avoid any unnecessary attempt to establish a connection with a discovered CSG femtocell which it is actually not authorised to access.

In a particular embodiment of the invention, the access right mentioned above corresponds to an authorisation for the terminal to access the CSG femtocell of the at least one identifier or to a ban for the terminal to access the CSG femtocell of the at least one identifier. The list of the terminal can thus be used as a whitelist or a blacklist.

Further, the message can be received from the remote server in response to an information request sent by said terminal. The sending of such an information request allows the terminal to prompt the remote server to send the message as described above, thereby expediting the discovering and selection procedure implemented by the terminal.

In a particular embodiment of the invention, the various steps of the method for accessing a CSG femtocell according to the invention are specified by computer program instructions.

Accordingly, an embodiment of the invention also provides a computer program on a recording medium, this computer program being arranged to be implemented by a terminal, and more generally by a processor, this computer program comprising instructions adapted for the implementation of a method for accessing a CSG femtocell as described above.

An embodiment of the invention also provides a recording medium readable by a terminal, or more generally by a processor, this recording medium comprising computer program instructions as mentioned above.

Correlatively, an embodiment of the invention provides a method implemented by a server for assisting a remote terminal in establishing a connection with a CSG femtocell of a first access network, the method comprising sending a message to the terminal via a second cellular access network different from the first access network, the message containing at least one parameter chosen among at least one frequency band to be scanned by the terminal for discovering at least one CSG femtocell, a key to be used by the terminal for decoding a data stream broadcasted by at least one CSG femtocell and at least one identifier of a CSG femtocell.

An embodiment of the invention allows a server to provide a terminal with useful and up-to-date information regarding CSG femtocells, and this before the terminal embarks into a discovering and selection procedure to connect to a reachable CGS femtocell. As a result, an embodiment of the invention allows the procedure for accessing CSG femtocells to be more efficient.

In a particular embodiment of the invention, the message contains at least one of the following:
  at least one positive identifier each of which corresponding to a CSG femtocell that the terminal is authorised to access; and
  at least one negative identifier each of which corresponding to a CSG femtocell that the terminal is not authorised to access.

This particular embodiment allows a terminal as mentioned above to dynamically update its CSG ID list and to use such a list as a whitelist (i.e. a list comprising CSG IDs of only authorised CSG femtocells) or a blacklist (i.e. a list comprising CSG IDs of only unauthorised CSG femtocells).

Further, the message can be determined by the server based on location information relative to the terminal. This allows the server to provide the terminal with even more pertinent access information, that is, information pertinent to the location of the terminal.

In a particular embodiment of the invention, the various steps of the method for assisting a remote terminal are specified by computer program instructions.

Accordingly, an embodiment of the invention also provides a computer program on a recording medium, this computer program being arranged to be implemented by a server, and more generally by a processor, this computer program comprising instructions adapted for the implementation of a method for assisting a remote terminal as described above.

An embodiment of the invention also provides a recording medium readable by a server, or more generally by a processor, this recording medium comprising computer program instructions as mentioned above.

The various computer programs mentioned above can be expressed in any programming language, and can be in the form of source code, object code, or any intermediary code between source code and object code, such that in a partially-compiled form, for instance, or in any other appropriate form.

In addition, the recording medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

Moreover, each recording medium previously mentioned can correspond to a transmittable medium, such as an electrical or an optical signal, which can be conveyed via an electric or an optic cable, or by radio or any other appropriate means. The computer program according to an embodiment of the invention can in particular be downloaded from the Internet or a network of the like.

Alternatively, the recording medium can correspond to an integrated circuit in which a computer program is loaded, the circuit being adapted to execute or to be used in the execution of the methods of an embodiment of the invention.

In particular, an embodiment of the invention provides a signal emitted by a server via a cellular access network, wherein the signal carries a message comprising at least one parameter chosen among at least one frequency band to be scanned by a terminal for discovering at least one CSG femtocell, a key to be used by the terminal for decoding a data stream broadcasted by at least one CSG femtocell and at least one identifier of a CSG femtocell.

An embodiment of the invention also provides a terminal operable to access a CSG femtocell of a first access network, wherein the terminal comprises a list which may contain at least one identifier of a CSG femtocell to which an access right for the terminal is defined, the terminal further comprising:
  scanning means for scanning at least one frequency band for discovering at least one CSG femtocell;
  decoding means for decoding, based on a key, a data stream broadcasted from the at least one CGS femtocell;
  obtaining means for obtaining, based on the decoded data stream, at least one identifier of the CSG femtocell; and
  determining means for determining, based on the list, whether the terminal has authorised access to the at least one discovered femtocell;
  the terminal being characterised in that it further comprises second determining means for determining at least one parameter chosen among the at least one frequency band, the key and the list based on a message received from a remote server via a second cellular access network different from the first access network.

In a particular embodiment, the access right corresponds to an authorisation for the terminal to access the CSG femtocell of the at least one identifier or to a ban for the terminal to access the CSG femtocell of the at least one identifier.

Correlatively, an embodiment of the invention provides a server for assisting a remote terminal in establishing a connection with a CSG femtocell of a first access network, the server comprising sending means for sending a message to the terminal via a second cellular access network different from the first access network, the message containing at least one parameter chosen among at least one frequency band to be scanned by the terminal for discovering at least one CSG femtocell, a key to be used by the terminal for decoding a data stream broadcasted by at least one CSG femtocell and at least one identifier of a CSG femtocell.

In a particular embodiment of the invention, the server is an ANDSF server. This may in particular be the case when the cellular access network is of the 3GPP type. An embodiment of the invention can then take advantage of the knowledge of an ANDSF server regarding user subscription data relative to the user's terminal, and more importantly, regarding the deployment configuration of CSG femtocells (carrier frequencies and PSCs used by CSG femtocells . . . ).

It is also noted that the various embodiments described above in reference to the method for accessing a CSG femtocell and the method for assisting a terminal can be implemented in an analogous manner in relation with respectively the terminal and the server of an embodiment of the invention.

Further, an embodiment of the invention also provides a method for controlling a terminal operable to access a CSG femtocell of a first access network, wherein the terminal comprises a list which may contain at least one identifier of a CSG femtocell to which an access right for said terminal is defined, the method comprising:
- a preliminary step for verifying whether a message received from a remote server includes at least one CSG identifier of a CSG femtocell, the message being received via a second cellular access network different from said first access network;
- if, and only if, the result of the preliminary step is positive, executing the following steps:
    - scanning at least one frequency band for discovering at least one CSG femtocell;
    - decoding, based on a key, a data stream broadcasted from the at least one CGS femtocell;
    - obtaining, based on the decoded data stream, at least one identifier of the CSG femtocell; and
    - updating the list with the received at least one CSG identifier and determining, based on the updated list, whether said terminal has authorised access to the at least one discovered femtocell.

This particular embodiment allows terminal to avoid embarking into a discovering and selection procedure to access a CSG femtocell, when no authorised CSG femtocell is available in the vicinity of the terminal, thereby avoiding a waste of time and battery power.

In an alternative of this particular embodiment, at least one parameter chosen among the at least one frequency band and the key is also determined based on the message received from the remote server.

In a particular embodiment of the invention, the various steps of the method for controlling a terminal as described above are specified by computer program instructions.

Accordingly, an embodiment of the invention also provides a computer program on a recording medium, this computer program being arranged to be implemented by a terminal, and more generally by a processor, this computer program comprising instructions adapted for the implementation of a method for controlling a terminal as described above.

An embodiment of the invention also provides a recording medium readable by a terminal, or more generally by a processor, this recording medium comprising computer program instructions as mentioned above.

The comments provided earlier in reference to the computer programs and recording mediums of embodiments of the invention apply in the same manner in this case.

Correlatively, an embodiment of the invention also provides a terminal comprising structural features for performing each step of the above defined method for controlling a terminal.

BRIEF DESCRIPTION OF THE DRAWINGS

One or more embodiments of the invention and advantages thereof will be described below in detail, by way of example, with reference to the accompanying drawings:

FIG. 3 is a block diagram of the main hardware components of a terminal according to an embodiment of the invention;

FIG. 4 is a block diagram of the main hardware components of a server according to an embodiment of the invention;

FIG. 5 is a flowchart showing the main steps of a method for accessing a CSG femtocell according to a particular embodiment of the invention; and FIG. 6 shows an example of a list updated by the terminal of FIG. 3.

DETAILED DESCRIPTION OF A PARTICULAR EMBODIMENT OF THE INVENTION

An embodiment of the invention relates to a method implemented by a terminal for accessing a CSG femtocell and, more particularly, to a discovering and selection procedure for connecting to a particular CSG femtocell.

To alleviate the drawbacks described above, the inventors have found that it is necessary to provide terminals with the capability of obtaining prior information relative to neighbouring CSG femtocell networks so as to assist them in their discovering and selection procedures.

Figure 1:
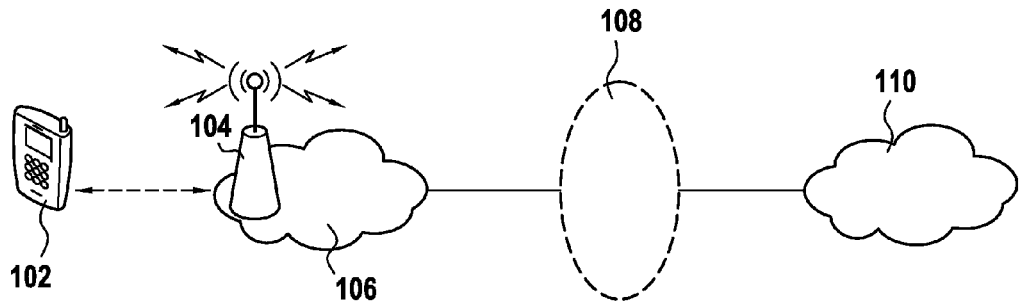
FIG. 1 is a block diagram representing a terminal which accesses a CSG femtocell according to a procedure known in the art.
Figure 2:
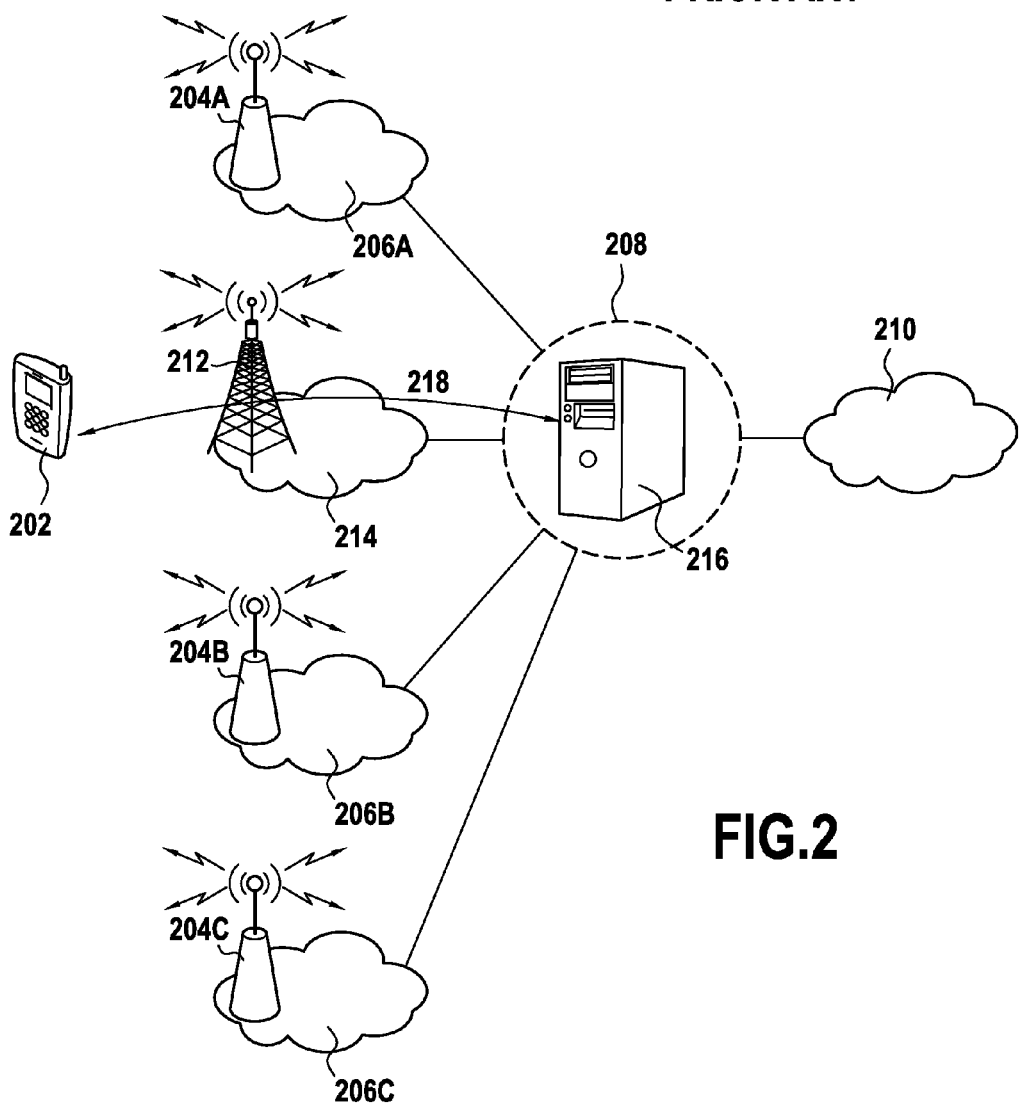
FIG. 2 is a block diagram representing a terminal accessing a CSG femtocell in accordance with a particular embodiment of the invention.

A particular embodiment of the invention will now be described in reference to FIGS. 2, 3 and 4. More specifically, FIG. 2 depicts a terminal 202, according to a particular embodiment of the invention, which is operable to communicate with a core network 208 via a first cellular access network 214. In this example, access network 214 is a 3GPP access network (such as a 2G, 3G or LTE network for instance). However, access network 214 may alternatively be a non-3GPP access network (either a trusted or an untrusted WLAN, using WIFI communication for instance).

FIG. 2 also shows three CSG femtocells 206A, 206B and 206C belonging to a second cellular access network. The CSG femtocells 206A to 206C can each serve as a relay between terminal 202 and core network 208.

Core network comprises a server according to a particular embodiment of the invention. In the present example, server 216 is an Access Network Discovery and Selection Function (ANDSF) server. However, in the case where the first cellular access network 214 is not of the 3GPP type, server 216 is not required to be of the ANDSF type.

Core network 208 is operable to route IP packets between the access networks 214 or 206A to 206C at one end, and the Internet 210 at the other end.

FIG. 3 depicts the hardware architecture of terminal 202 according to a particular embodiment of the invention. In this example, terminal 202 presents the hardware architecture of a computer. In particular, terminal 202 comprises a processor 302, a RAM memory 304, a ROM memory 306 and a communication interface 308 enabling terminal 202 to communicate with cellular access networks, such as 3GPP networks, non-3GPP networks and CSG femtocell networks. Terminal 202 further comprises scanning means 310 for scanning at least one predetermined frequency band. Scanning means 310 allows terminal 202 to discover the presence of neighbouring mobile stations of reachable CSG femtocells.

The ROM memory 306 of terminal 202 constitutes a recording medium in accordance with an embodiment of the invention. The ROM memory 306 includes a computer program PG1 according to an embodiment of the invention, this computer program comprising instructions to implement a method of an embodiment of the invention, which main steps (S2 to S16) are shown in the flowchart of FIG. 5. ROM memory 306 also contains a list L according to an embodiment of the invention (which will be further described below in reference to FIG. 6).

Furthermore, FIG. 4 depicts the hardware architecture of ANDSF server 216 according to a particular embodiment of the invention. In this example, ANDSF 216 presents the hardware architecture of a computer. In particular, ANDSF 216 comprises a processor 402, a RAM memory 404, a ROM memory 406 and a communication interface 408 enabling ANDSF 216 to communicate with terminal 202 via first access network 214.

The ROM memory 406 of ANDSF 216 constitutes a recording medium in accordance with an embodiment of the invention. The ROM memory 406 includes a computer program PG2 according to an embodiment of the invention, this computer program comprising instructions to implement a method of an embodiment of the invention, which main steps (S2 to S16) are shown in the flowchart of FIG. 5.

A particular embodiment of the invention will now be described in reference to FIGS. 2, 3, 4 and 5.

It is hereafter assumed that the user of terminal 202 has CSG subscription and wishes to access IP services on the Internet 210 via a CSG femtocell of the second cellular access network. As explained earlier, terminal 202 must perform a discovering and selection procedure. The discovering procedure allows discovering one or more reachable CSG femtocells in the vicinity of terminal 202. By executing the selection procedure, terminal 202 is then capable of selecting a discovered CSG femtocell which terminal 202 is authorised to access.

To alleviate the drawbacks identified earlier, an embodiment of the present invention proposes to provide ANDSF-based assistance to terminal 202 in its discovering and selection procedure.

More specifically, terminal 202 first connects to the first cellular access network 214 by attaching to the associated base station 212 (step S2). In this example, access network 214 is a 3GPP network. The connection procedure is therefore performed in accordance with 3GPP standard.

Once connected to access network 214, terminal 202 performs an ANDSF discovering procedure to discover ANDSF server 216 located within core network 216 (step S4). This procedure allows terminal 202 to establish a communication channel 218 with ANDSF 216 via first access network 214. In the present example, communication channel 218 is a 3GPP specified interface "S14".

In this embodiment, terminal 202 then sends an Access Network Info Request message (hereafter called "information request message") to ANDSF server 216 using communication channel 218 (step S6). The information request message informs ANDSF server 216 that terminal 202 wishes to obtain CSG femtocell information for accessing an authorised CSG femtocell.

According to the 3GPP standard, an Access Network Info Request message normally sent by a terminal to a conventional ANDSF server includes information regarding the terminal's capability (capability information) and location (location information). Such information is required by 3GPP standard to retrieve conventional access network information and inter-system policies. However, including location information and/or capability information into the information request message is only optional in the present invention. These kinds of information are actually not required by ANDSF server 216 to operate according to an embodiment of the invention.

ANDSF 216 is capable of determining the CSG femtocells which terminal 202 is authorised to access (named hereafter "authorised CSG femtocells"), based on user subscription data associated with the user of terminal 202. In this example, it will be assumed that terminal 202 is authorised to access networks 206A and 206B whereas access is denied on access network 206C.

In response to the information request message, ANDSF server 216 sends back to terminal 202 an Access Network Info Response (named hereafter "information response message") using communication channel 218 (step S8). This information request message contains CSG femtocell information relative to the authorised CSG femtocells corresponding to terminal 202.

According to an embodiment of the invention, this information response message contains at least one of the following parameters:
  at least one frequency indicator corresponding to a carrier frequency;
  at least one specific PSC used by an authorised CSG femtocell;
  at least one CSG ID corresponding to a unique authorised CSG femtocell.

These parameters are hereafter named "access parameters". In order to fully describe the role and characteristics of each above access parameter, it will be assumed in this example that the information response message sent by ANDSF server 216 contains:
  frequency indicators FIA and FIA associated respectively with CSG femtocells 206A and 206B, where FIA and FIB correspond respectively to two frequency bands FRA and FRB;
  primary scrambling codes PSCA and PSCB corresponding respectively to CSG femtocell 206A and 206B; and
  CSG identifiers CSG IDA and CSG IDB corresponding respectively to CSG femtocell 206A and 206B.

It should however be noted that the information response message of an embodiment of the invention may only contain one of the above exemplary parameters, or any combination thereof.

Once the information response message received (step S8), terminal 202 proceeds with updating its internal list L stored in memory 306 (step S10).

In this example, terminal 202 discovered the presence of CSG IDA and CSG IDB in the received information response message. In fact, in the present example, the CSG IDs contained in the received information response message are positive CSG IDs, i.e. CSG IDs corresponding to CSG femtocells that terminal 202 is authorised to access (also named "authorised" CSG femtocells). However, in another embodiment, ANDSF server 216 can be configured to provide terminal 202 with only negative CSG IDs, i.e. CSG IDs corresponding to CSG femtocells that terminal 202 is forbidden to access (also named "unauthorised" CSG femtocells).

Based on the received CSG IDs, terminal 202 can update its list L.

In this example, the list L is used by terminal 202 as a whitelist, i.e. a list comprising solely CSG IDs of the positive type. Accordingly, terminal 202 updates the list L at step S10 by replacing all the existing positive CSG IDs contained therein (if any) with the positive CSG IDs provided by ANDSF server 216 at step S8. However, in another embodiment, the list L can be used by terminal 202 as a blacklist, i.e. a list comprising solely CSG IDs of the negative type. In a particular embodiment, terminal 202 updates its blacklist L at step S10 by replacing all the existing negative CSG IDs contained therein (if any) with negative CSG IDs provided by ANDSF server 216 at step S8.

It another alternative, ANDSF server is configured to provide terminal 202 with a combination of positive and negative CSG IDs. In this case, terminal 202 may use list L as a whitelist or a blacklist, and is able to determine for each received CSG ID, whether it is of the positive type or of the negative type.

It is also worth noting that list L may or may not contain any CSG ID prior to updating step S10.

Terminal 202 also temporarily stores FIA, FIB, PSCA and PSCB in its ROM memory 306 at step S10. In this example, terminal 202 arranges the list L as described in FIG. 6.

Terminal 202 then executes a discovering and selection procedure (step S12) based on the CSG femtocell information obtained from the received information response message.

First, the discovering procedure performed by terminal 202 includes a scanning search using scanning means 310 (step S14). During the scanning search, terminal 202 searches for messages broadcasted by base stations (macrocell and femtocell) within its vicinity.

In the present case, terminal 202 consults its list L and detects the presence of frequency indicators FIA and FIB provided by ANDSF server 216 at step S8. FIA and FIB define respectively two frequency bands FRA and FRB that terminal 202 must scan during the scanning process. In fact, FRA and FRB have been provided by ANDSF server 216 because they are used respectively by CSG femtocells 206A and 206B for broadcasting cell- or system specific data.

Therefore, based on the received FIA and FIB, terminal 202 determines that it must limit its scanning search to the frequency bands FRA and FRB. In other words, no scanning is to be performed for the frequencies excluded from the frequency bands FRA and FRB.

Further, during the discovering procedure S14, terminal 202 receives encoded data streams broadcasted by CSG femtocells 206A and 206B. These data streams constitute for instance encoded pieces of cell-specific data relative to CSG femtocells 206A and 206B. Terminal 202 is configured to use, as decoding keys, PSCA and PSCB provided by ANDSF server 216 so as to decipher the encoded cell-specific data received from CSG femtocells 206A and 206B, respectively.

It is noted that the unauthorised CSG femtocell 206C may use the same or a similar carrier frequency as authorised CSG femtocell 206A and/or 206B. In this case, terminal will also receive encoded cell- or system-specific data from CSG femtocell 206C. In addition, if the primary scrambling code "PSCC" of CSG femtocell 206C is identical to PSCA and/or PSCB, terminal 202 may also decode cell-specific data broadcasted by CSG femtocell 206C.

Based on the decoded pieces of cell-specific data, terminal 202 is thus able to determine the CSG IDs of each discovered CSG femtocell, that is, CSG IDA, CSG IDB and possibly the CSG IDC. In this example, it will be assumed that terminal 202 has discovered CSG femtocell 206C during the scanning and that CSG IDC has been decoded.

Once the CSG IDs broadcasted by the discovered CSG femtocells (i.e. CSG femtocells 206A, 206B and 206C) are discovered, terminal 202 determines which of the discovered CSG femtocells it is authorised to access (if any) in step S16.

To do so, terminal 202 consults the updated list L (used here as a whitelist) contained in ROM memory 306 and compares the decoded CSG IDs broadcasted by the discovered CSG femtocells with the authorised CSG IDs listed in the updated list L. From this comparison operation, terminal 202 deduces which among the discovered CSG femtocells 206A to 206C terminal 202 is authorised to access.

In the present example, list L is used as a whitelist by terminal 202. As the whitelist L comprises the CSG IDs of only CSG femtocells 206A and 206B, terminal 202 determines from the comparison process that:
   it is authorised to access CSG femtocell 206A and 206B (i.e. 206A and 206B are recognised as authorised CSG femtocells for terminal 202);
   it is forbidden to access CSG femtocell 206C (i.e. 206C is recognised as an unauthorised CSG femtocell for terminal 202).

Once the authorised CSG femtocells have been discovered, terminal 202 selects one thereof. Terminal 202 can then attach to the corresponding base station so as to communicate with the Internet 210 via core network 208.

More specifically, if a single discovered CSG femtocell is recognised as an authorised CSG femtocell, then terminal 202 selects this particular CSG femtocell. If, however, several discovered CSG femtocells are recognised as authorised CSG femtocells (as is the case in the present example), terminal 202 may select any one of them. In a particular embodiment, terminal 202 selects a preferred CSG femtocell among the authorised discovered CSG femtocells based on a selection policy stored within ROM memory 306. This preconfigured policy allows terminal 202 to define an order of preference for each of the CSG IDs contained within the list L.

Accordingly, in the above example, terminal 202 uses the information response message sent by ANDSF server 216 to determine the following parameters:
   the frequency bands to be scanned; these are determined by terminal 202 based on the received frequency indicators FIA and FIB;
   the PSCs to be used as decoding keys at step S14; these PSCs correspond to the PSCs provided by ANDSF server 216 in the received information response message; and
   the list L to be used to determine which among the discovered CSG femtocells terminal 202 is authorised to access (if any); the list L is updated based on CSG IDs contained in the received information response message.

However, as indicated above, the information response message sent by ANDSF server 216 at step S8 may only contain:
   one or a plurality of frequency indicators,
   one or a plurality of PSCs, or
   one or a plurality of CSG IDs, or any combination thereof.

If, for instance, the information request message received at step S8 contains no frequency indicator, terminal 202 proceeds with the scanning search at step S14 in a conventional manner. In other words, terminal 202 will scan the entire spectrum of the supported frequency band(s) as preconfigured in its ROM memory 306.

Furthermore, if the information request message received at step S8 contains no PSC, terminal 202 proceeds with determining the PSCs associated with each discovered CSG femtocell in a conventional manner. In other words, terminal 202 performs the synchronization mechanism mentioned above to determine the PSCs to be used for decoding messages broadcasted by the discovered CSG femtocells.

Finally, if the information request message received at step S8 contains no CSG ID, terminal 202 relies solely on the existing list L (whether this list is empty or not) to determine which among the discovered CSG femtocells terminal 202 is authorised to access (if any).

At this point, it should be noted that, under other circumstances, terminal 202 may determine at step S16 that none of the CSG IDs broadcasted by the discovered CSG femtocells are included within the updated whitelist L. This means that terminal 202 is not authorised to access any of the reachable CSG femtocell that it has discovered during the scanning search at step S14. This may be the case, for instance, when the whitelist L is empty (because the user of terminal 202 has no CSG subscription, for instance). It follows that, based on the result of the discovering step S14, terminal 202 is able to determine whether it should proceed with selection step S16 to select an authorised discovered CSG femtocell.

Further, if the list L is used as a blacklist, the comparison process during the discovering step S14 slightly differs from the case where list L is used as a whitelist. More specifically, terminal 202 compares at step S16 the CSG IDs broadcasted by the discovered CSG femtocells with the CSG IDs contained in the updated blacklist: the broadcasted CSG IDs which are not included in the updated blacklist are recognised by terminal 202 as corresponding to authorised CSG femtocells. Conversely, the broadcasted CSG IDs which are included in the updated blacklist are recognised by terminal 202 as corresponding to unauthorised CSG femtocells.

Further, in the present example, the information response message is generated and sent by ANDSF server 216 in response to an information request message originating from terminal 202. In other words, the sending of the information response message has been solicited or triggered by terminal 202. In an alternative embodiment of the invention, ANDSF server 216 is configured to send unsolicited access network information to terminal 202 (i.e. not in response to an information request message originating from terminal 202). In this case, step S6 described earlier is not performed and the flow of FIG. 5 goes directly from S4 to S8. Such unsolicited sending can be performed, for instance, based on networks triggers. ANDSF server 216 may for instance be configured to send such information periodically or as soon as it detects that a connection has been established between terminal 202 and the first access network 214 (as soon as communication channel 218 is established for instance).

In a particular embodiment, ANDSF server 216 is configured to retrieve location information relative to terminal 202 and to determine the content of the information response message to be sent at step S8 based on the retrieved location information. More specifically, terminal 202 can be configured to determine at least one access parameter based in particular on location information relative to terminal 202. ANDSF server 216 is for instance configured to provide terminal 202 with only access parameters which are relevant to the current location of terminal 202. ANDSF server 216 may thus provide terminal 202 with CSG IDs, PSCs and/or frequency indicators associated with CSG femtocells authorised for terminal 202 and which are located within the vicinity of terminal 202 (e.g. in a circular region of a predetermined size).

The location information mentioned above may be retrieved in different ways by ANDSF server 216. As previously indicated, the invention does not require the information request message sent by terminal 202 to include capability information or location information, although this may be the case. In a first alternative of the above embodiment, ANDSF server 216 is configured to retrieve location information relative to terminal 202 from the information request message sent by terminal 202 at step S6 (if any such location information is included in the information request message). In a second alternative, ANDSF server 216 can be configured to retrieve location information from first access network 214 to which terminal 202 is connected or from another applicable source.

Furthermore, the updating step S10, the discovering step S14 and the selection step S16 are all implemented by processor 302 using RAM memory 304 and ROM memory 306. The scanning search performed at step S14 also involves the use of scanning means 310. Moreover, the step of receiving the information response message originating from ANDSF server 216 is implemented by processor 302 using in particular communication interface 308.

Turning to ANDSF server 216, the steps of receiving an information request message and sending an information response message are implemented by processor 302 using RAM memory 304, ROM memory 306 and communication interface 408.

An embodiment of the present invention takes advantage of the knowledge of ANDSF server 216 regarding user subscription data relative to terminal 202, and more importantly, regarding the deployment configuration of CSG femtocells (carrier frequencies and PSCs used by CSG femtocells . . . ). To obtain such knowledge, ANDSF server 216 is able collect up-to-date information regarding the operator's deployment strategy, network planning, frequency allocation etc.

An embodiment of the invention thus allows terminal 202 to obtain useful access information regarding CSG femtocells prior to embarking into a discovering and selection procedure to connect to a reachable CGS femtocell. As a result, an embodiment of the invention allows the procedure for accessing CSG femtocells to be more efficient.

In particular, an embodiment of the invention enables a terminal to dynamically determine, prior to initiating a discovering procedure, at least one access parameter chosen among:
  a frequency to be scanned by said terminal for discovering at least one CSG femtocell;
  a PSC to be used as a key for decoding a message broadcasted by a CSG femtocell; and
  a CSG identifier of a CSG femtocell.

If at least one frequency indicator is included in the information response message received from ANDSF 216, terminal 202 deduces therefrom which frequency band(s) should be scanned for discovering reachable CSG femtocells. This obviates the need for terminal 202 to perform an unnecessary scanning search throughout the entire spectrum of the supported CSG frequency band, thereby leading to a significant gain in time and power consumption and thus making the scanning process more efficient.

An embodiment of the invention also allows a terminal to use the PSC(s) included in a received information response message to decipher messages broadcasted by discovered CSG femtocells. ANDSF server 216 for example is able to provide terminal 202 with up-to-date PSCs which are associated with CSG femtocells that terminal 202 is authorised to access. As a result, an embodiment of the invention allows terminal 202 to avoid performing a trial and error process during the discovering procedure to determine which PSC should be used in connection with each discovered CSG femtocell. The scanning process is therefore made more efficient.

An embodiment of the invention further allows a terminal to use the CSG ID(s) included in a received information response message to dynamically update its list L, whether this list is used as a whitelist or a blacklist. An embodiment of the invention allows for instance terminal 202 to keep its list L up-to-date and to avoid unnecessarily attempting to establish a connection with a discovered CSG femtocell which the terminal is actually not authorised to access.

In a particular embodiment of the invention, terminal 202 is further configured to determine, based on the information response message received at step S8, whether the discovering and selection procedure (step S12) should be performed. Such a configuration may for instance be implemented when ANDSF server 216 generates the information response message to be sent at step S8, based on location information relative to terminal 202. In this case, terminal 202 is configured to verify, prior to embarking into step S12, whether at least one CSG ID is included in the information response message received at step S8. If it is the case, terminal proceeds with step S12 as already described above. Otherwise, terminal 202 deduces that it is not authorised to access any of the reachable CSG femtocells in the neighbourhood. In this case, terminal 202 stops the discovering and selection process.

This particular embodiment allows terminal 202 to avoid embarking into a laborious scanning search when terminal 202 is not authorised to access any of the CSG femtocells (if any) in the neighbourhood, thereby leading to a significant gain of time and power consumption.

Although the present disclosure has been described with reference to one or more examples, workers skilled in the art will recognize that changes may be made in form and detail without departing from the scope of the disclosure and/or the appended claims.

The invention claimed is:

1. A method for accessing a Closed Subscriber Group (CSG) femtocell of a first access network, said method comprising the following acts performed by a terminal:
    scanning at least one frequency band for discovering at least one CSG femtocell, wherein said terminal comprises a list which may contain at least one identifier of a CSG femtocell to which an access right for said terminal is defined;
    decoding, based on a key, a data stream broadcasted from said at least one CGS femtocell;
    obtaining, based on said decoded data stream, at least one identifier of said CSG femtocell;
    determining, based on said list, whether said terminal has authorised access to said at least one discovered femtocell ; and
    choosing with said terminal at least one parameter among said at least one frequency band, said key and said list, based on a message received from a remote server via a second cellular access network different from said first access network.

2. The method of claim 1, wherein said access right corresponds to an authorisation for said terminal to access the CSG femtocell of said at least one identifier or to a ban for said terminal to access the CSG femtocell of said at least one identifier.

3. The method of claim 1, wherein said message is received from said remote server in response to an information request sent by said terminal.

4. A method for assisting a remote terminal in establishing a connection with a Closed Subscriber Group (CSG) femtocell of a first access network, said method comprising:
    sending a message from a hardware component of a server to said terminal via a second cellular access network different from said first access network, said message containing at least one parameter chosen among at least one frequency band to be scanned by said terminal for discovering at least one CSG femtocell, a key to be used by said terminal for decoding a data stream broadcasted by at least one CSG femtocell and at least one identifier of a CSG femtocell.

5. The method of claim 4, wherein said message contains at least one of the following:
    at least one positive identifier each of which corresponding to a CSG femtocell that said terminal is authorised to access; and
    at least one negative identifier each of which corresponding to a CSG femtocell that said terminal is not authorised to access.

6. The method of claim 4, wherein said message is determined by said server based on location information relative to said terminal.

7. A non-transitory computer-readable recording medium comprising a computer program comprising instructions for carrying out a method for accessing a Closed Subscriber Group (CSG) femtocell of a first access network, when said computer program is run on a computer of a terminal, wherein the method comprising the following acts performed by the terminal:
    scanning at least one frequency band for discovering at least one CSG femtocell, wherein said terminal comprises a list which may contain at least one identifier of a CSG femtocell to which an access right for said terminal is defined;
    decoding, based on a key, a data stream broadcasted from said at least one CGS femtocell;
    obtaining, based on said decoded data stream, at least one identifier of said CSG femtocell;
    determining, based on said list, whether said terminal has authorised access to said at least one discovered femtocell ; and
    choosing with said terminal at least one parameter among said at least one frequency band, said key and said list, based on a message received from a remote server via a second cellular access network different from said first access network.

8. A non-transitory computer-readable recording medium storing a computer program comprising instructions for carrying out for assisting a remote terminal in establishing a connection with a Closed Subscriber Group (CSG) femtocell of a first access network when said computer program is run on a computer of a server, said method comprising the following acts performed by the server:
    sending a message from a hardware component of a server to said terminal via a second cellular access network different from said first access network, said message containing at least one parameter chosen among at least one frequency band to be scanned by said terminal for discovering at least one CSG femtocell, a key to be used by said terminal for decoding a data stream broadcasted by at least one CSG femtocell and at least one identifier of a CSG femtocell.

9. A terminal operable to access a Closed Subscriber Group (CSG) femtocell of a first access network, wherein said terminal comprises:
    a list which may contain at least one identifier of a CSG femtocell to which an access right for said terminal is defined;
    scanning means for scanning at least one frequency band for discovering at least one CSG femtocell;
    decoding means for decoding, based on a key, a data stream broadcasted from said at least one CGS femtocell;
    obtaining means for obtaining, based on said decoded data stream, at least one identifier of said CSG femtocell;

determining means for determining, based on said list, whether said terminal has authorised access to said at least one discovered femtocell; and second determining means for determining at least one parameter chosen among said at least one frequency band, said key and said list based on a message received from a remote server via a second cellular access network different from said first access network.

10. The terminal of claim 9, wherein said access right corresponds to an authorisation for said terminal to access the CSG femtocell of said at least one identifier or to a ban for said terminal to access the CSG femtocell of said at least one identifier.

11. A server for assisting a remote terminal in establishing a connection with a Closed Subscriber Group (CSG) femtocell of a first access network, said server comprising:

sending means for sending a message to said terminal via a second cellular access network different from said first access network, means for generating said message, wherein the message contains at least one parameter chosen among at least one frequency band to be scanned by said terminal for discovering at least one CSG femtocell, a key to be used by said terminal for decoding a data stream broadcasted by at least one CSG femtocell and at least one identifier of a CSG femtocell).

12. The server of claim 11, wherein said server is an Access Network Discovery and Selection Function (ANDSF) server.

13. A method for controlling a terminal operable to access a Closed Subscriber Group (CSG) femtocell of a first access network, wherein the terminal comprises a list which may contain at least one identifier of a CSG femtocell to which an access right for said terminal is defined, the method comprising:

a preliminary step of the terminal verifying whether a message received from a remote server includes at least one CSG identifier of a CSG femtocell, said message being received via a second cellular access network different from said first access network;

if, and only if, the result of the preliminary step is positive, executing the following acts by the terminal:

scanning at least one frequency band for discovering at least one CSG femtocell);

decoding, based on a key, a data stream broadcasted from the at least one CGS femtocell;

obtaining, based on the decoded data stream, at least one identifier of the CSG femtocell; and updating the list with the received at least one CSG identifier and determining, based on the updated list, whether said terminal has authorised access to the at least one discovered femtocell.

\* \* \* \* \*